US012567231B2

(12) United States Patent    (10) Patent No.:   US 12,567,231 B2

Li et al.      (45) Date of Patent:     Mar. 3, 2026

(54) WEAKLY SUPERVISED ACTION LOCALIZATION

(71) Applicant: NEC Laboratories America, Inc., Princeton, NJ (US)

(72) Inventors: Kai Li, Plainsboro, NJ (US); Renqiang Min, Princeton, NJ (US); Deep Patel, Monmouth Junction, NJ (US); Erik Kruus, Hillsborough, NJ (US); Xin Hu, College Station, TX (US)

(73) Assignee: NEC Cortporation, Tokyo (JP)

( * ) Notice: Subject to any disclaimer, the term of this patent is extended or adjusted under 35 U.S.C. 154(b) by 302 days.

(21) Appl. No.: 18/363,175

(22) Filed: Aug. 1, 2023

(65) Prior Publication Data

US 2024/0046606 A1    Feb. 8, 2024

Related U.S. Application Data

(60) Provisional application No. 63/439,178, filed on Jan. 16, 2023, provisional application No. 63/395,885, filed on Aug. 8, 2022.

(51) Int. Cl.
| | |
|---|---|
| *G06V 10/62* | (2022.01) |
| *G06V 10/77* | (2022.01) |
| *G06V 10/774* | (2022.01) |
| *G06V 10/776* | (2022.01) |
| *G06V 10/82* | (2022.01) |
| *G06V 20/40* | (2022.01) |

(52) U.S. Cl.
CPC .......... *G06V 10/62* (2022.01); *G06V 10/7715* (2022.01); *G06V 10/774* (2022.01); *G06V*

*10/776* (2022.01); *G06V 10/82* (2022.01); *G06V 20/41* (2022.01); *G06V 20/46* (2022.01)

(58) Field of Classification Search
CPC .... G06V 10/62; G06V 10/7715; G06V 20/46; G06V 10/82; G06V 20/41; G06V 10/774; G06V 10/776
See application file for complete search history.

(56) References Cited

U.S. PATENT DOCUMENTS

| | | | | |
|---|---|---|---|---|
| 2019/0325275 A1* | 10/2019 | Lee | ................. | G06V 30/19167 |
| 2023/0046066 A1* | 2/2023 | Bulat | ................. | G06V 10/7715 |
| 2023/0090941 A1* | 3/2023 | Li | ................. | G06V 20/40 |
| | | | | 382/157 |

OTHER PUBLICATIONS

"A Hybrid Attention Mechanism for Weakly-Supervised Temporal Action Localization" Ashraful et al. The Thirsty-Fifth AAAI Conference on Artificial Intelligence (AAAI-21), Feb. 2021. (Year: 2021).*

(Continued)

*Primary Examiner* — Syed Haider

(74) *Attorney, Agent, or Firm* — Vincent Duffy; Joseph Kolodka

(57) ABSTRACT

Methods and systems for temporal action localization include processing a video stream to identify an action and a start time and a stop time for the action using a neural network model that separately processes information of appearance and motion modalities from the video stream using transformer branches that include a self-attention and a cross-attention between the appearance and motion modalities. An action is performed responsive to the identified action.

12 Claims, 7 Drawing Sheets

(56)　　　　　　References Cited

OTHER PUBLICATIONS

"Low Rank Fusion based Transformers for Multimodal Sequences" Saurav Sahay et al., Proceedings of the 58th Annual Meeting of the Association for computational Linguistics, Jul. 2020. (Year: 2020).*
"Learning Temporal Co-Attention Models for Unsupervised Video Action Localization" Guoqiang et al., 2020 IEEE/CVF Conference on computer vision and pattern recognition(CVPR), Aug. 2020. (Year: 2020).*
Hong et al., "Cross-modal Consensus Network for Weakly Supervised Temporal Action Localization", arXiv:2107.12589v1 [cs.CV], Jul. 27, 2021, pp. 1-9.

* cited by examiner 101          104          102          106          100

WEAKLY SUPERVISED ACTION LOCALIZATION

RELATED APPLICATION INFORMATION

This application claims priority to U.S. Patent Application No. 63/395,885, filed on Aug. 8, 2022, and to U.S. Patent Application No. 63/439,178, filed on Jan. 16, 2023, incorporated herein by reference in their entirety.

BACKGROUND

Technical Field

The present invention relates to temporal action localization and more particularly to machine learning techniques for localizing the starting and end frames of an action in a video.

Description of the Related Art

Training a model with annotated data may use the starting and end frames for actions shown within a video. However, such annotation is difficult to obtain, as it makes use of human annotators to manually identify the actions within the video and the relevant timing information.

SUMMARY

A method for temporal action localization includes processing a video stream to identify an action and a start time and a stop time for the action using a neural network model that separately processes information of appearance and motion modalities from the video stream using transformer branches that include a self-attention and a cross-attention between the appearance and motion modalities. An action is performed responsive to the identified action.

A system for temporal action localization includes a hardware processor and a memory that stores a computer program. When executed by the hardware processor, the computer program causes the hardware processor to process a video stream to identify an action and a start time and a stop time for the action using a neural network model that separately processes information of appearance and motion modalities from the video stream using transformer branches that include a self-attention and a cross-attention between the appearance and motion modalities, and to perform an action responsive to the identified action.

A method for training a neural network model includes pre-training transformers within a neural network model. The transformers each include a self-attention and a cross-attention between appearance and motion modalities from a video stream. The neural network model is tuned to perform temporal action localization, using a loss function that includes a mutual learning loss and a pseudo-label loss that considers weakly annotated training data identifying an action within a video without identifying start and stop times of the action.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments that employ weakly supervised temporal action localization may train models using video-level annotations that specify categories of action, without specific temporal positions being provided for the actions. To this end, a cross-modal transformer network may be used. The cross-modal transformer network may use process appearance information and motion information as two different modalities. Transformers model the in-modality and cross-modality frame relations.

A training dataset of untrimmed videos may be used, with appearance information being extracted as red-green-blue (RGB) values and with motion information being extracted as optical flow features. These types of information may be interpreted as separate modalities, in which RGB features represent static information and optical flow represent dynamic information. The cross-modal model includes two transformer modules, with cross-modal cross-attention, to refine the input features. The model includes two transformers that each output a separate feature stream, which may be used to generate attention weights for action proposals. Because two features are derived from the same video, a consistency loss may be used to constrain a distance between the two attention weights.

The features output by the transformers may be combined, for example by concatenation, to form a fused feature. The fused feature is as input to a classifier that performs action classification on the entire video. Multi-instance may be used to improve classification performance with the video-level labels. During training, the consistency loss and the multi-instance learning loss may be minimized with different weight factors.

Pseudo-labels may be used to enhance performance of the model. Predicted attention weights and a temporal class activation map (TCAM) may be used to generate a pseudo-TCAM. The pseudo-TCAMs are used as supervision for temporal information. An uncertainty is used to filter out false positive action proposals from the pseudo-TCAMs. The model may learn uncertainty scores for each frame, which suppresses the confidence for background frames. The uncertainty score may be embedded into pseudo-label loss to enforce a tradeoff between the distance of the pseudo-labels and the uncertainty.

Figure 1:
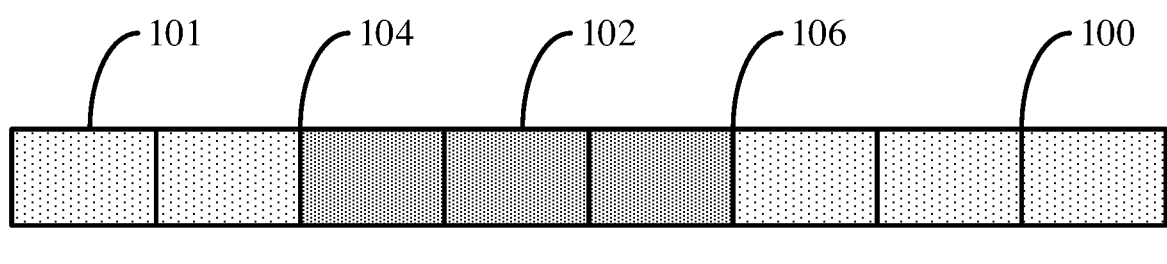
FIG. 1 is a diagram of frames of a video stream that illustrates temporal action localization, in accordance with an embodiment of the present invention.

Referring now to FIG. 1, an exemplary video stream 100 is illustrated, being made up of a series of sequential video frames 101. Each video frame 101 may include an image that captures a camera's view at a particular time. Included in the video stream 100 is a series of action frames 102 that show a particular action taking place. The action frames 102 have a beginning time 104 and an ending time 106.

In a fully annotated video stream, the video stream 100 may include labels that explicitly indicate the beginning time 104 and the ending time 106, and may further include a label that identifies the action taking place in the action frames 102. In a weakly annotated video stream, the video stream 100 may lack labels for the beginning time 104 and the ending time 106, but may still include a label that identifies the action as taking place somewhere within the video stream 100.

Each frame 101 includes multiple kinds of information. For example, each frame 101 may include appearance information that includes RGB values for each pixel of the frame 101, or any other appropriate encoding of static visual information. In addition, more than one frame 101 may be considered together to identify motion information, for example by identifying optical flow information that captures dynamic and motion information from one frame 101 to the next.

In one example of a video stream 100, the video stream 100 may capture a sporting event, such as a long jump. The action frames 102 may show the actual jump taking place, while frames 101 before and after the action frames 101 may show related or unrelated activity, such as the jumper's run leading up to the jump and the jumper landing and walking away. In a weakly annotated video stream, the exemplary video stream 100 may indicate that a jump is shown, without indicating which of the frames 101 in the video stream 100 represent the action frames 102.

From an annotation perspective, video-level labels are relatively easy to generate by a human being who views the video stream, while action localization labels that identify the beginning time 104 and ending time 106 take significantly more time to set with precision. However, using a combination of the appearance information and the motion information of the video stream 100, the weakly annotated video stream can be enhanced to include temporal action localization information using a cross-modal attention.

Figure 2:
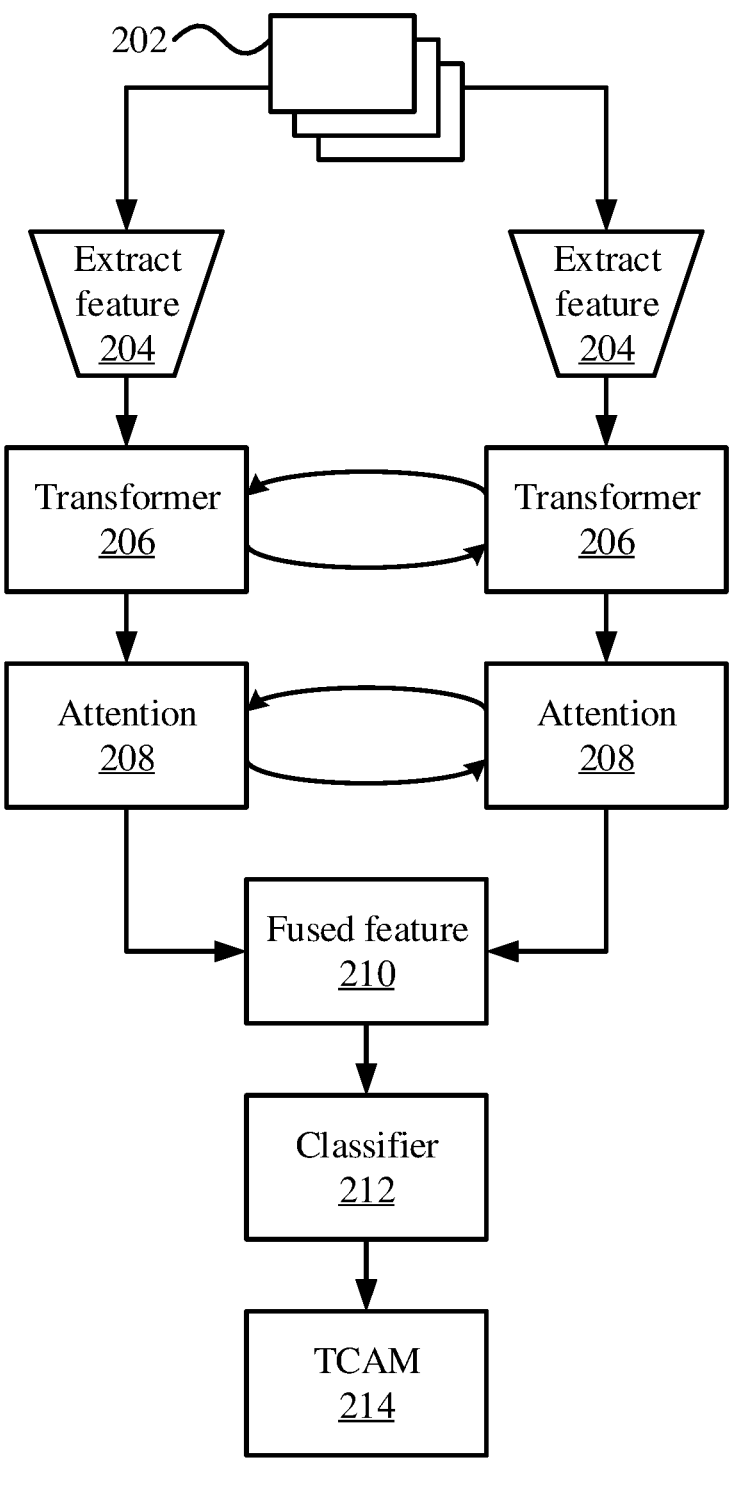
FIG. 2 is a block diagram of a machine learning model that performs temporal action localization, in accordance with an embodiment of the present invention.

Referring now to FIG. 2, a cross-modal, cross-attention, cross-supervision network for weakly supervised temporal action localization is shown. A video stream 202 is processed by separate feature extractors 204. A first feature extractor 204 extracts appearance features, such as RGB information, from the video stream 202, while a second feature extractor 204 extracts motion features, such as optical flow information, from the video stream 202. In one exemplary embodiment, a pre-trained I3D model may be used for both types of feature extraction. The feature extractors 204 may include pre-trained I3D models, with the motion information being extracted using a TV-L1 approach.

These initial features may be represented as a series of snippets. In at least one embodiment, a snippet may include a series of sixteen non-overlapping frames sampled from the video stream 202. Each snippet may include, for example, a 2048-dimensional vector, with the first 1024 elements being the appearance feature and the other 1024 elements being the motion feature. During training, the number of snippets may be fixed to a predetermined number depending on Transformers 206 process the respective feature modalities, with cross-attention to handle relationships between the different modalities of the frames. The transformers 206 thereby extract latent features, which attention units 208 use for cross-supervision via a consistency loss function. The cross-attention of the transformers 206 models temporal information between different frames, using complementary information between the different modalities. The structure of the transformers 206 is described in greater detail below.

The latent features may be fused 210, for example by concatenation, and the fused features may be input to a classifier 212, which performs action classification on the entire video. The classifier 212 outputs a temporal class activation map that may include a classification matrix for each frame. The temporal class activation map may be used in conjunction with a video-level label in a multi-instance learning loss function to perform video level action classification that generates pseudo-labels. In an iterative process, the pseudo-labels may be used to supervise the prediction of the temporal class activation map in a next iteration. In at least one embodiment, the classifier 212 may be implemented with three temporal convolutional layers, with dropout layers between them at a rate of 0.7 to regularize intermediate features.

A pseudo-temporal class activation map is generated by applying a threshold to the output temporal class activation map from the classifier 212. For example, those values above the threshold are set to 1, while those values under the threshold are set to 0. The temporal class activation map may be a matrix having dimensions $T \times (C+1)$ and may store the per-frame classification probability of the T frames over the $C+1$ action classes, including the foreground classes and one background class.

The pseudo-labels help to train the model with weak annotations. The quality of the pseudo-labels may be evaluated on the basis of uncertainty to produce reliable pseudo-labels and to mitigate the impact of incorrect pseudo-labels.

Given an untrimmed video set $\{\mathcal{V}_i\}_{i=1}^{N}$, where N is the number of videos and i is an index of the sequence sample, the video-level label is associated as $\{y_i\}_{i=1}^{N}$, where $y_i \in \mathbb{R}^C$, C is a total number of action categories, and $y_{i,c}$ indicates the existence of an action c in $\mathcal{V}_i$. The term $y_i$ is a multi-label vector when there is more than one action in the input video and may be normalized with an $\ell_1$-norm.

Each video $\mathcal{V}_i$ is divided into a sequence of T non-overlapping snippets $\{\mathcal{X}_1, \ldots, \mathcal{X}_T\}$. These snippets are used as the inputs to the feature extractors 204 to generate feature representations $X_r \in \mathbb{R}^{T \times D}$ and $X_o \in \mathbb{R}^{T \times D}$, where D denotes the dimension of the features, r denotes the appearance modality, and o denotes the optical flow modality. The model seeks to generate a set of action proposals $(t_s, t_e, c)$, where $t_s$ and $t_e$ are the starting snippet timestamp and ending snippet timestamp respectively and where c indicates an action category.

The transformers 206, described functionally herein as $\mathcal{F}_e(\cdot)$, are trained to learn latent features $Z_r \in \mathbb{R}^{T \times D}$ and $Z_o \in \mathbb{R}^{T \times D}$, which are subsequently concatenated as $Z_m = [Z_r, Z_o] \in \mathbb{R}^{(T \times 2D)}$ and used as inputs to the video-level action classifier 212, which is described functionally here in as $\mathcal{F}_c(\cdot)$. The temporal class activation map 214 may be denoted as $O_{cam} = \mathcal{F}_c(Z_m)$, where $O_{cam} \in \mathbb{R}^{T \times C+1}$ includes $C+1$ dimensions, with the last dimension being designated as the background.

The latent features are used as inputs to attention units 208, described functionally herein as $\mathcal{F}_a(\bullet)$, to generate attention weights $a_r \in \mathbb{R}^T$ and $a_o \in \mathbb{R}^T$. To suppress the background parts of $O_{cam}$, the attention weights are integrated as $a_m = \frac{1}{2}(a_r + a_o)$ to obtain the suppressed output as $\hat{O}_{cam} = a_m \otimes O_{cam}$, where $\otimes$ is an element-wise multiplication along the temporal dimension.

The multi-instance learning loss $\mathcal{L}_{mil}$ is used to perform video-level classification and may be expressed as:

$$\mathcal{L}_{mil} = \mathcal{L}_{ce}(y, p_{cam}) + \mathcal{L}_{ce}(y, \hat{p}_{cam})$$

where $p_{cam}$ and $\hat{p}_{cam}$ are video-level prediction scores with temporal top-k pooling on $O_{cam}$ and $\hat{O}_{cam}$, respectively. The cross-entropy loss $\mathcal{L}_{ce}(\bullet, \bullet)$ is performed over the video-level ground truth y and the prediction $p_{cam}$.

A pseudo-label loss with uncertainty estimation may be expressed as:

$$\mathcal{L}_{pseudo} = \frac{1}{T}\sum_{t=1}^{T} e^{-u_t} \mathcal{L}_{ce}(\hat{p}_t, o_t) + \tau u_t$$

where $u_t$ denotes the uncertainty value for each snippet t from one convolution layer of $Z_m$, $\tau$ is a hyper-parameter, $o_t \in \mathbb{R}^{C+1}$ is the snippet from $O_{cam}$, and $\hat{p}_t \in \mathbb{R}^{C+1}$ represents snippet-level pseudo-labels.

A mutual learning loss enforces consistency between $a_r$ and $a_o$:

$$\mathcal{L}_{ml} = \frac{1}{2}(\mathcal{L}_{mse}(a_r, \phi(a_o)) + \mathcal{L}_{mse}(\phi(a_r), a_o))$$

where $\phi(\bullet)$ represents a function that truncates the gradient of its input and $\mathcal{L}_{mse}(\bullet, \bullet)$ denotes a mean square loss function. Attention weights may be made more sparse using a $\ell_1$-normalization term:

$$\mathcal{L}_{norm} = \frac{1}{3}(\|a_r\|_{l_1} + \|a_o\|_{l_1} + \|a_m\|_{l_1})$$

where $\|\cdot\|_{\ell_1}$ is the $\ell_1$-norm.

The last vector of $O_{cam}$ is the probability distribution of the background class, $p_b$. This may have the opposite value as the distribution of the attention weight:

$$\mathcal{L}_{opp} = \frac{1}{3}(|a_r + p_b - 1| + |a_o + p_b - 1| + |a_m + p_b - 1|)$$

where $|\bullet|$ is the absolute value function.

The final objective function for the base model may then be determined as:

$$\mathcal{L} = \mathcal{L}_{mil} + \mathcal{L}_{ml} + \lambda_0 \mathcal{L}_{pseudo} + \lambda_1 (\mathcal{L}_{norm} + \mathcal{L}_{opp})$$

where $\lambda_0$ and $\lambda_1$ are hyper-parameters for the pseudo-label and regularization terms. In at least one embodiment, $\lambda_0$ may be set to 10 for the pseudo-label loss and $\lambda_1$ may be set to 0.8.

The multi-modal transformer fusion described above captures complementary information across the modalities to enhance feature generalization, despite the potential for noisy patterns to arise in the pseudo-labels and attention weights. A plateau function may be used to further improve the temporal localization, refining the temporal attention weight to a more continuous pattern in the temporal dimension.

To efficiently explore the complementary information between the appearance and motion modalities, the most similar parts between the static and the dynamic information are addressed and redundant noise can be filtered out. Two attention maps, $M_r \in \mathbb{R}^{T \times T}$ and $M_o \in \mathbb{R}^{T \times T}$, may be defined as soft-masks in the respective appearance and motion branches, and may be normalized with global softmax to capture the most similar action segments between the modalities.

Figure 3:
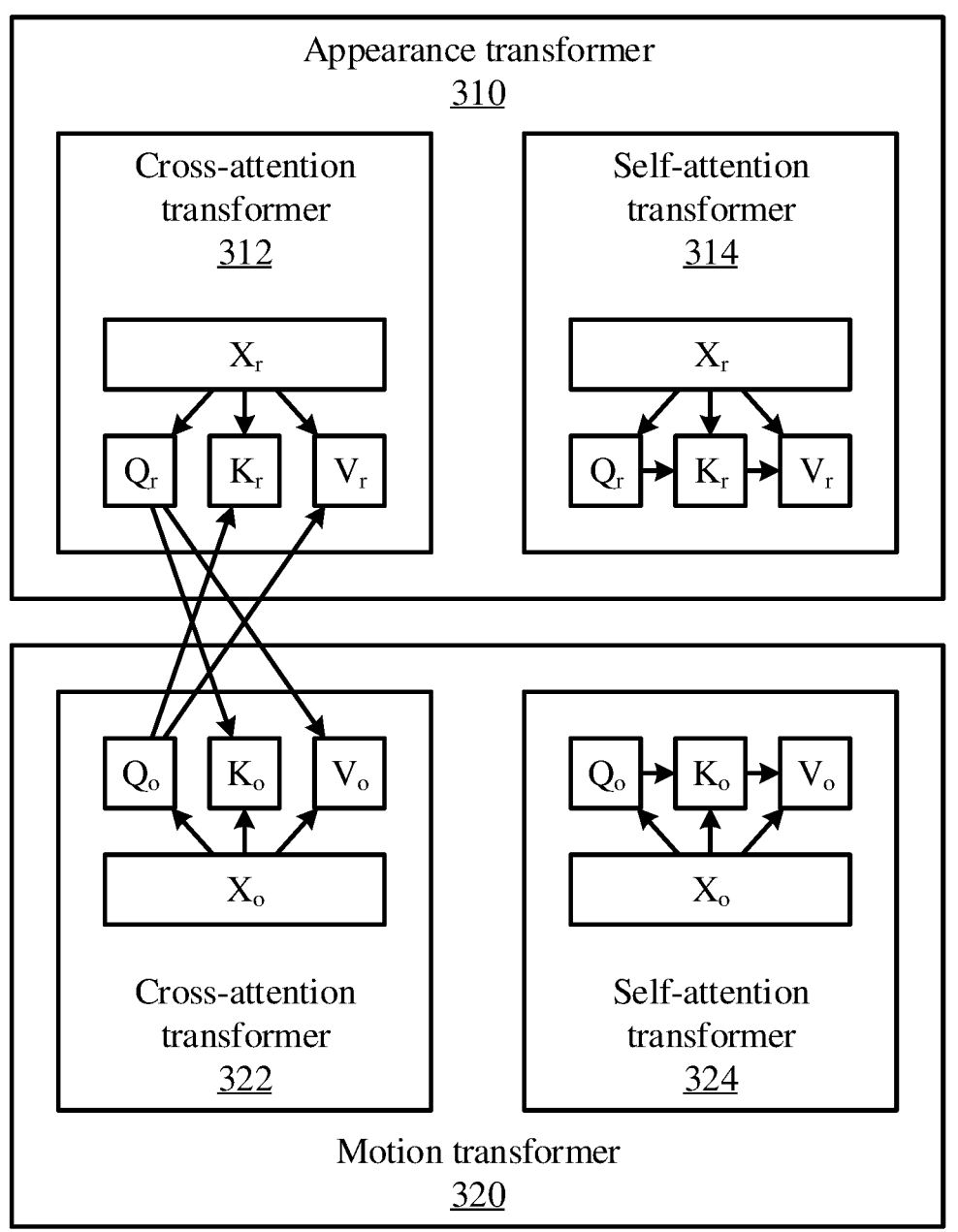
FIG. 3 is a block diagram illustrating cross-attention and self-attention transformers in branches of different modalities within the machine learning mode, in accordance with an embodiment of the present invention.

Referring now to FIG. 3, additional detail on the transformers 206 is shown. The transformers 206 include an appearance transformer 310, which takes appearance features as its input, and motion transformer 320, which takes motion information as its input. The appearance transformer 310 includes cross-attention transformer 312 and self-attention transformer 314, and the motion transformer 320 similarly includes cross-attention transformer 322 and self-attention transformer 324.

The transformers 310 and 320 may include multi-head designs, with an exemplary embodiment having four heads each. The attention of each transformer may have three convolutional layers, with output dimensions of 512, 512, and 1, and with kernel sizes of 3, 3, and 1. Two dropout layers may be included with a rate of 0.5 in the attention units. The self-attention and cross-attention may share the same model weights.

The appearance transformer 310 makes use of query $Q_r = X_r W_{qr}$, key $K_r = X_r W_{kr}$, and value $V_r = X_r W_{vr}$, while the motion transformer 320 makes use of query $Q_o = X_o W_{qo}$, key $K_o = X_o W_{ko}$, and value $V_o = X_o W_{vo}$. The terms $W_{qr}$, $W_{kr}$, $W_{vr}$, $W_{qo}$, $W_{ko}$, and $W_{vo}$ are matrices in $\mathbb{R}^{D \times D}$ that represent linear projections for the generating queries, the keys, and the values for the appearance and motion modalities. These maps are used by the transformers to generate refined latent features:

$$I_r = X_r + \mathcal{F}_{drop}(M_r V_r W_r)$$

$$I_o = X_o + \mathcal{F}_{drop}(M_o V_o W_o)$$

$$Z_r = I_r + \mathcal{F}_{MLP}(\mathcal{F}_{LN}(I_r))$$

$$Z_o = I_o + \mathcal{F}_{MLP}(F_{LN}(I_o))$$

where $W_r$ and $W_o$ are learnable projections, $\mathcal{F}_{LN}(\bullet)$ is a layer normalization function, $\mathcal{F}_{drop}(\bullet)$ and $\mathcal{F}_{MLP}(\bullet)$ are dropout and multilayer perceptron functions, and $I_r$ and $I_o$ are intermediate latent features for the appearance and motion modalities respectively.

Different values for $M_{r/o}$ may be defined for self-attention and cross-attention transformers. For the appearance self-attention transformer 314:

$$M_r = \frac{Q_r K_r^T}{\sqrt{T}}$$

For the motion self-attention transformer 324:

$$M_r = \frac{Q_o K_o^T}{\sqrt{T}}$$

For the appearance cross-attention transformer 312:

$$M_r = \frac{Q_o K_r^T}{\sqrt{T}}$$

For the motion cross-attention transformer 322:

$$M_r = \frac{Q_r K_o^T}{\sqrt{T}}$$

Pre-trained cross-modal features may be refined with static and motion information from different modalities to find the most similar segments at a same time, reducing the impact of background snippets.

To further refine temporal localization, a plateau refined distribution may be used on $a_m$. Specifically, the plateau fitting function may be defined to model the probability density distribution over snippets x of an untrimmed video as:

$$\mathcal{F}_P(x|t_c, \omega, \varsigma) = \frac{1}{\left(e^{\varsigma(x-t_c-\omega)}+1\right)\left(e^{\varsigma(-x-t_c-\omega)}+1\right)}$$

where $\mathcal{F}_P(\bullet|\bullet)$ is the plateau function over the center of the plateau $t_c$, the width $\omega$, and the steepness of the boundary $\varsigma$. The range of the function is [0,1]. The plateau function may be fit to $a_m$ to obtain the refined values:

$$t_c, \omega, \varsigma = \arg\min_{t_c,\omega,\varsigma} \mathcal{L}_{mse}(a_m, \mathcal{F}_P)$$

The plateau function serves to filter out background information while reserving edge action boundaries. To build the plateau distribution, thresholds may be applied to $a_m$ to obtain multiple action proposals and their associated attention weights $\hat{a}_m$. Each $\hat{a}_m$ is input to the above minimization in the place of $a_m$ to fit $\mathcal{F}_P$ through the mean square loss function to produce $t_c$, $\omega$, $\zeta$. $\mathcal{F}_P$ replaces $\hat{a}_m$ as new attention weights and refines its time scale. In at least one embodiment, the thresholds may include 0.4 for action proposal generation and 0.45 for background proposal generation.

The new attention weights may be expressed as w to represent $\omega$ and c to represent $t_c$. Specifically, $t_c$ is around the highest-scoring snippet in $\hat{a}_m$, $\omega$ constrains the width to filter out background snippet and slope, and $\varsigma$ preserves edge action snippets. However, $\omega$ is generally wider than the real action scale and may include background snippets. Background attention weights $b_m$ are introduced where, similar to $a_m$, thresholds are applied to $b_m$ to obtain background proposals and to build a background plateau distribution. There may therefore be two kinds of plateau distribution for each video sample, and the overlap area may be filtered out with refined attention weights to produce a refined plateau.

Figure 4:
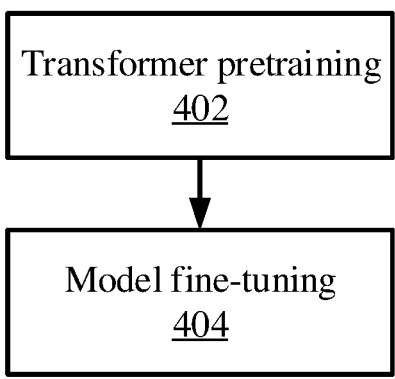
FIG. 4 is a block/flow diagram of a method for training a machine learning model, in accordance with an embodiment of the present invention.

Referring now to FIG. 4, a method of training a machine learning model is shown. The model includes pre-training 402 the transformers 206, followed by fine-tuning 404 of the entire model. The transformers 206 refine the output of the pre-trained feature extractors 204. To increase the training stability, a reconstruction loss is used during the pre-training of feature embedding function $\mathcal{F}_e(\bullet)$:

$$\mathcal{L}_{rec} = \mathcal{L}_{mse}(Z_r, X_r) + \mathcal{L}_{mse}(Z_o, X_o)$$

which enforces proximity between the learned $Z_r$ and $Z_o$ and $X_r$ and $X_o$ so that effective information from the pre-trained features are not lost. Once the transformers 206 are pre-trained, the entire model can be trained 404, minimizing the loss function $\mathcal{L}$ described above using a low learning rate. Convergence can be sped up using an extra co-activity similarity loss.

Because two types of transformer architecture are being used, optimization may include a combination of cross-attention and self-attention. Using the pseudo-labels generated by these two attention mechanisms, a cross-supervision mechanism may be implemented that uses L. Plateau refinement is iteratively optimized after the cross-supervision training until the model converges or until a maximum number of iterations is reached.

Figure 5:
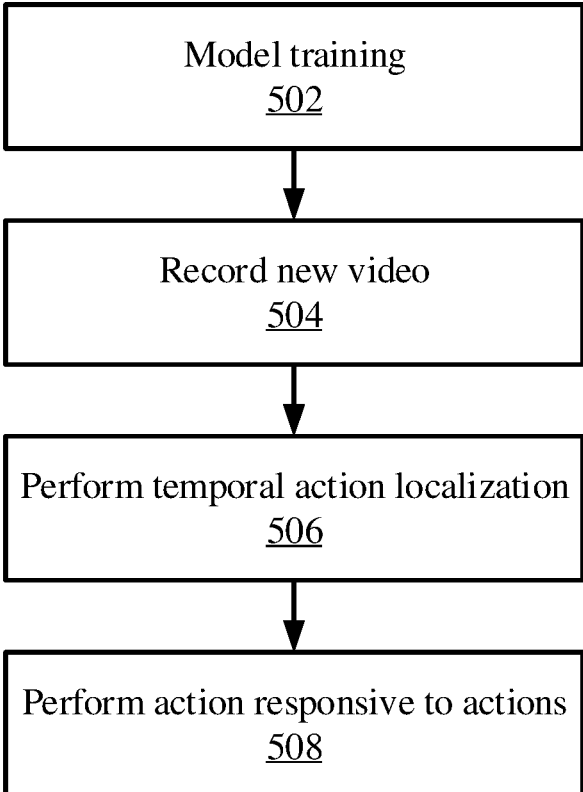
FIG. 5 is a block/flow diagram of a method for performing temporal action localization using a trained machine learning model, in accordance with an embodiment of the present invention.

Referring now to FIG. 5, a method of performing temporal action localization is shown. Block 502 trains the model as described above, using any appropriate training dataset that may include weakly annotated video streams. The training 502 may be performed well in advance of implementation of the model, and may be performed in a different location and by a different party relative to the subsequent steps. However, it is also contemplated that the steps of this process may be performed by a single party or separately by any number of different parties.

Block 504 records a new video stream. This step may be performed before training model training 502, concurrently with that training, or subsequent to that training. The new video may include a set of frames that includes one or more actions of interest, but may be unlabeled. In at least one embodiment, the new video may include video of a sporting event where one or more individuals performs actions relating to the sport.

Block 506 performs temporal action localization on the new video using the trained model. The model may output include labels for the action being performed as well as timestamps that identify the beginning and ending of the action. The output may include labels for multiple such actions within a single new video, performed by one or more actors.

Based on the labels generated by the model for the new video, block 508 performs a responsive action. Following the above example of a sporting event, the responsive action may include automatically generating additional information relating to the detected action such as an identification of the actor, statistics relating to the actor or the detected action, and updates to the state of the sporting event based on the outcome of the action. For example, a duration of the action may be determined based on the starting time and ending time, and the duration may be used to report on or control the state of the event. Other uses for temporal action localization include security monitoring, for example identifying hazardous events in a video feed, and video labeling to segment videos based on semantic meaning to aid in summarizing important information from the video.

Figure 6:
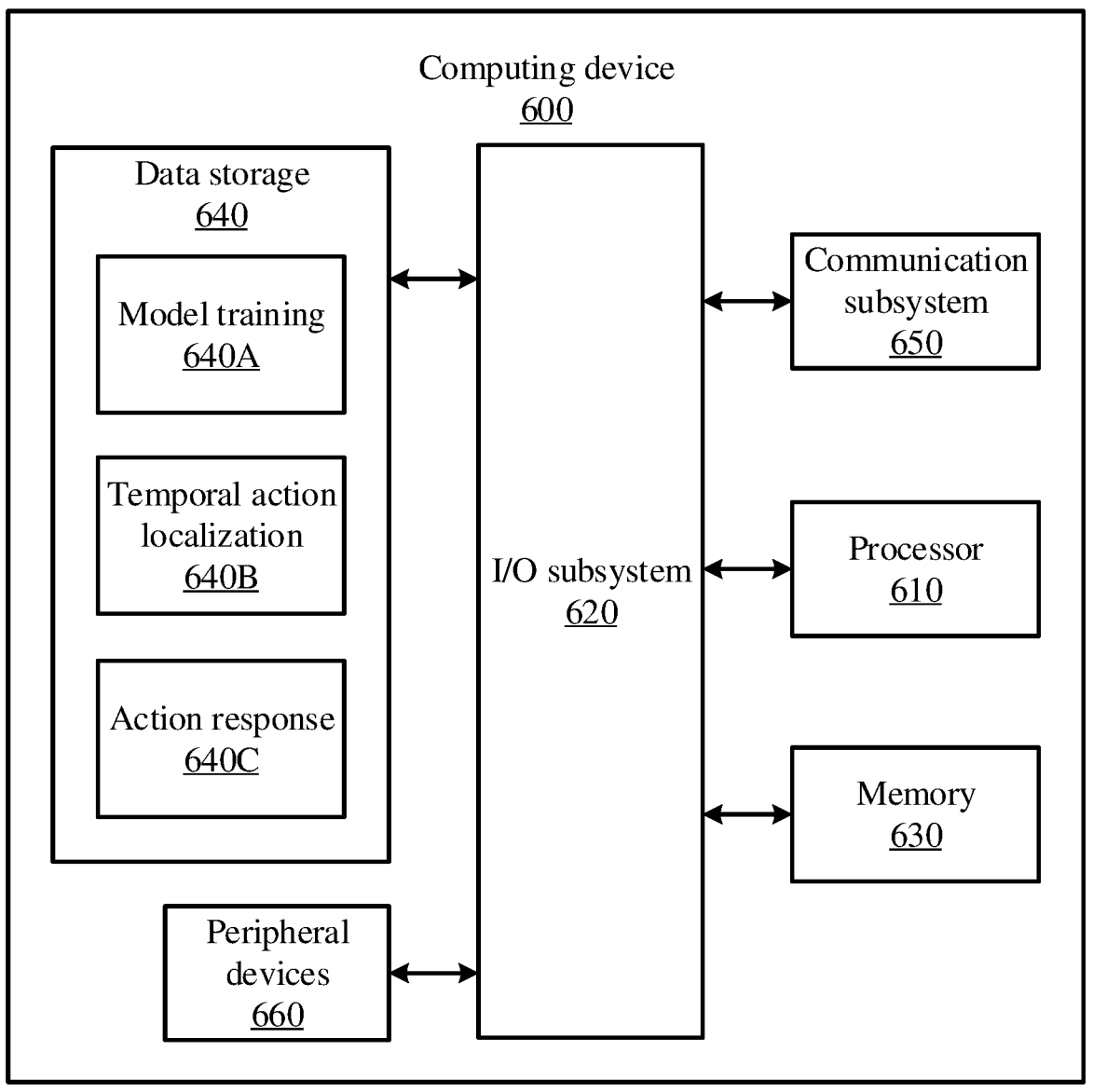
FIG. 6 is a block diagram of a computing device that can perform model training and temporal action localization, in accordance with an embodiment of the present invention.

Referring now to FIG. 6, an exemplary computing device 600 is shown, in accordance with an embodiment of the present invention. The computing device 600 is configured to perform classifier enhancement.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for performing training of the model, 640B for temporal action localization, and/or 640C for responding to detected actions. Any or all of these program code blocks may be included in a given computing system. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Figure 7:
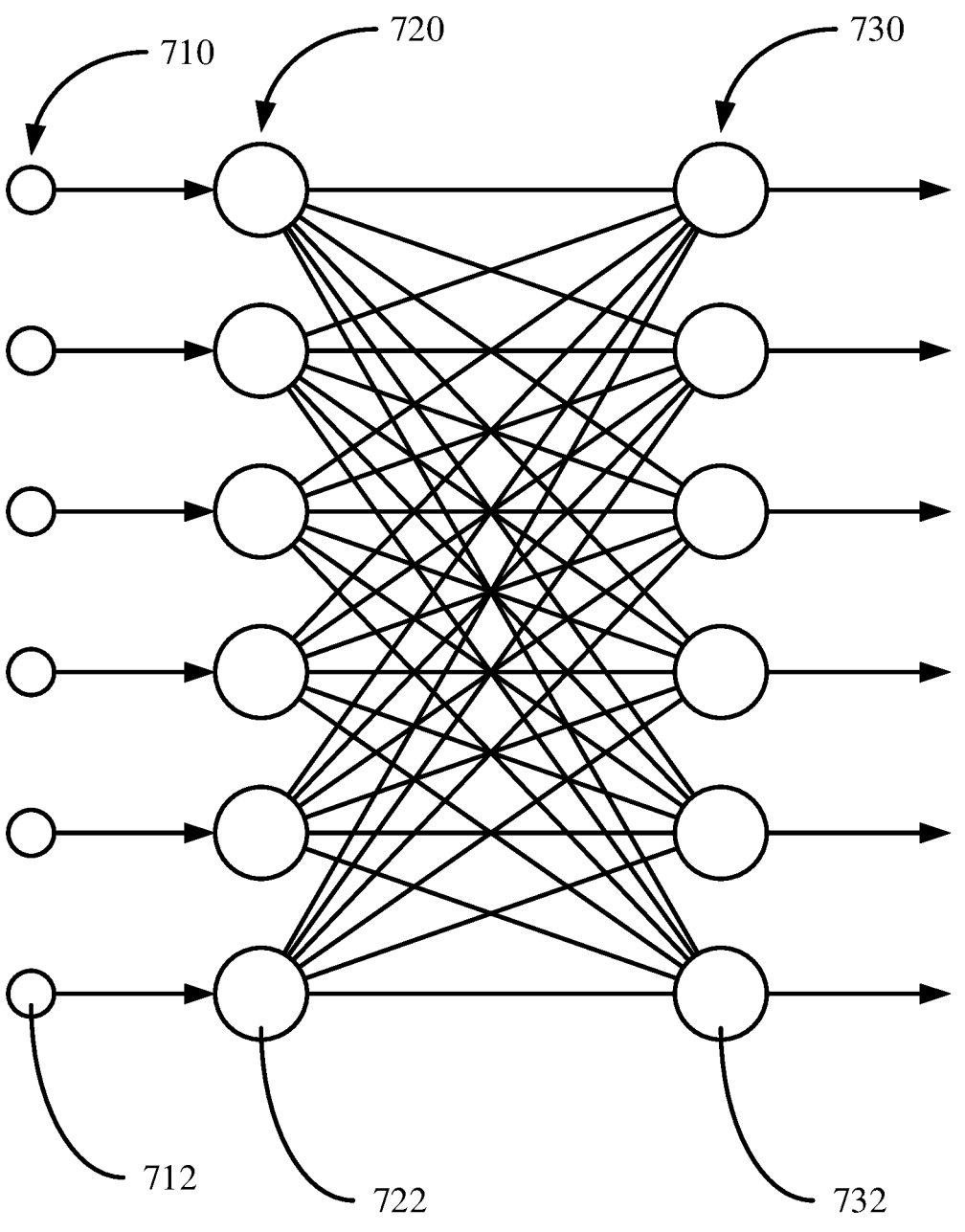
FIG. 7 is a diagram of a neural network architecture that can be used to implement part of the neural network model, in accordance with an embodiment of the present invention.
Figure 8:
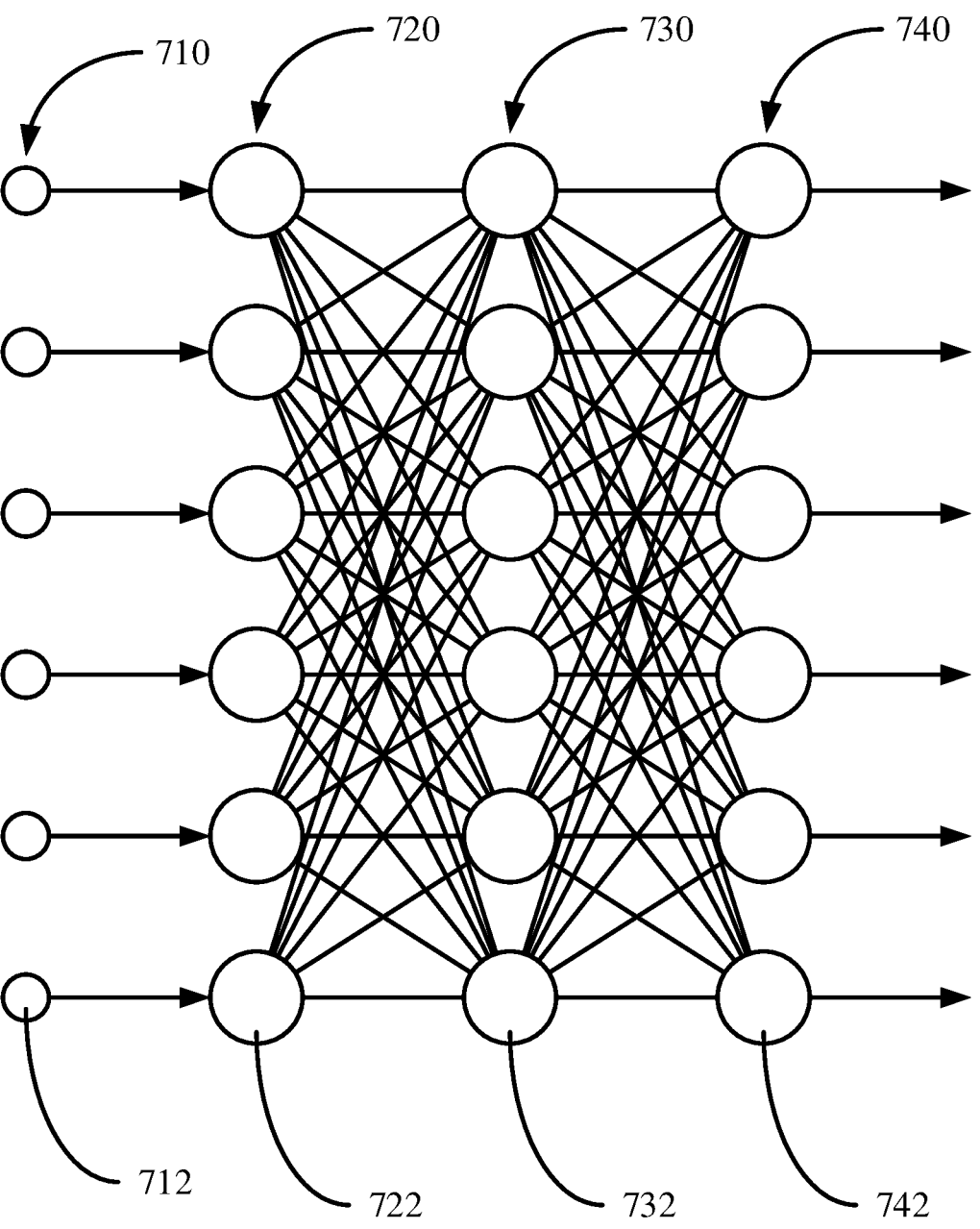
FIG. 8 is a diagram of a neural network architecture that can be used to implement part of the neural network model, in accordance with an embodiment of the present invention.

Referring now to FIGS. 7 and 8, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a neural network model, comprising:

pre-training transformers within a neural network model, wherein the transformers each include a self-attention and a cross-attention between appearance and motion modalities from a video stream; and tuning the neural network model to perform temporal action localization, using a loss function that includes a mutual learning loss and a pseudo-label loss that considers weakly annotated training data identifying an action within a video without identifying start and stop times of the action, including generating a pseudo-temporal class activation map that includes a matrix having thresholded per-frame classification probabilities for a set of action classes, wherein the pseudo-label loss considers the pseudo-temporal class activation map and an associated uncertainty to mitigate an impact of incorrect pseudo-labels and is expressed as $$\mathcal{L}_{pseudo} = \frac{1}{T}\sum_{t=1}^{T} e^{-u_t}\mathcal{L}_{ce}(\hat{p}_t, o_t) + \tau u_t$$

where T is a number of snippets, $u_t$ denotes an uncertainty value for a snippet t, $\mathcal{L}_{ce}$ is a cross-entropy loss term based on snippet-level pseudo-labels $\hat{p}_t$, $o_t$ is a snippet from a temporal class activation map, and $\tau$ is hyper-parameter.

2. The method of claim 1, wherein the mutual learning loss enforces consistency between appearance attention weights and motion attention weights.

3. The method of claim 2, wherein the mutual learning loss is expressed as:

$$\mathcal{L}_{ml} = 1/2(\mathcal{L}_{mse}(a_r, \phi(a_0)) + \mathcal{L}_{mse}(\phi(a_r), a_o))$$

where $\mathcal{L}_{mse}$ is a mean square loss function based on appearance attention weights $a_r$ and motion attention weights $a_o$ and $\phi(\bullet)$ is function that truncates a gradient of its input.

4. The method of claim 1, wherein the transformers include an appearance transformer that receives appearance features as input and a motion transformer that receives motion features as input.

5. The method of claim 4, wherein the cross-attention of the appearance transformer includes key and value terms that are influenced by a query term of the cross-attention of the motion transformer and wherein the cross-attention of the motion transformer includes key and value terms that are influenced by a query term of the cross-attention of the appearance transformer.

6. The method of claim 1, wherein the neural network model includes a classifier that generates a temporal class activation map that includes a matrix having per-frame classification probabilities for a set of action classes.

7. The method of claim 6, wherein the classifier accepts as input a fused feature that concatenates outputs of the transformer branches.

8. A computer-implemented method for training a neural network model, comprising:

pre-training transformers within a neural network model, wherein the transformers each include a self-attention and a cross-attention between appearance and motion modalities from a video stream; and tuning the neural network model to perform temporal action localization, using a loss function that includes a mutual learning loss and a pseudo-label loss that considers weakly annotated training data identifying an action within a video without identifying start and stop times of the action, wherein the mutual learning loss enforces consistency between appearance attention weights and motion attention weights and is expressed as:

$$\mathcal{L}_{ml} = 1/2(\mathcal{L}_{mse}(a_r, \phi(a_0)) + \mathcal{L}_{mse}(\phi(a_r), a_o))$$

where $\mathcal{L}_{mse}$ is a mean square loss function based on appearance attention weights $a_r$ and motion attention weights $a_o$ and $\phi(\bullet)$ is function that truncates a gradient of its input.

9. The method of claim 8, wherein the transformers include an appearance transformer that receives appearance features as input and a motion transformer that receives motion features as input.

10. The method of claim 9, wherein the cross-attention of the appearance transformer includes key and value terms that are influenced by a query term of the cross-attention of the motion transformer and wherein the cross-attention of the motion transformer includes key and value terms that are influenced by a query term of the cross-attention of the appearance transformer.

11. The method of claim 8, wherein the neural network model includes a classifier that generates a temporal class activation map that includes a matrix having per-frame classification probabilities for a set of action classes.

12. The method of claim 11, wherein the classifier accepts as input a fused feature that concatenates outputs of the transformer branches.

\* \* \* \* \*